Sept. 17, 1935.    G. JOHNSON    2,015,035
SEPARABLE END FASTENER MEMBERS FOR MULTIPLE OPERATED FASTENERS
Filed July 29, 1931
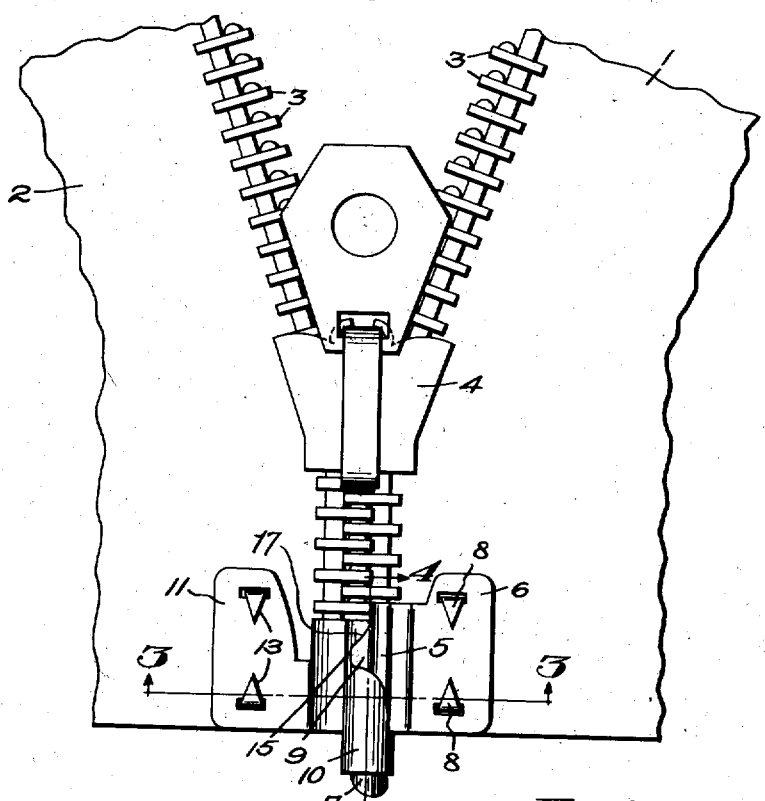
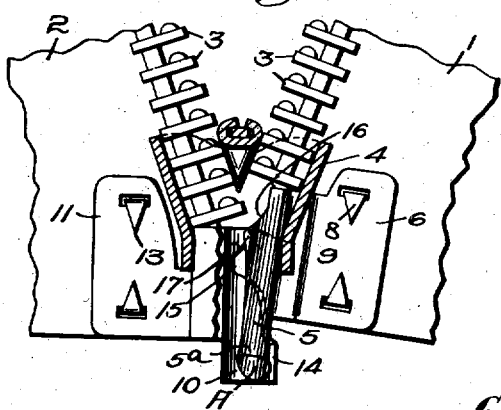
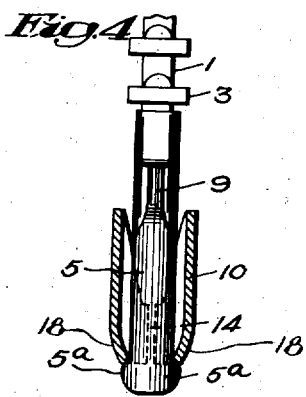
Inventor:
Gustav Johnson Patented Sept. 17, 1935

2,015,035

UNITED STATES PATENT OFFICE 2,015,035

SEPARABLE END FASTENER MEMBERS FOR MULTIPLE OPERATED FASTENERS

Gustav Johnson, West Roxbury, Mass., assignor to United-Carr Fastener Corporation, Cambridge, Mass., a corporation of Massachusetts Application July 29, 1931, Serial No. 553,771

11 Claims. (Cl. 24—205)

My invention aims to provide improvements in multiple operated fastening installations and particularly improvements in separable end fastening members to permit complete separation of the stringers of the installation.

In the drawing which illustrates a preferred embodiment of my invention:—

Figure 1 is an enlarged plan view of a portion of a multiple operated fastening installation showing my improved end fastening members;

Fig. 2 is a plan view of the end portion of the installation showing the slider in plan section and in the proper position for engagement and disengagement of the end fastening means, the male member being partly entered into the female member;

Fig. 3 is an enlarged section taken on the line 3—3 of Figure 1; and

Fig. 4 is an enlarged section taken on the line 4—4 of Figure 1.

Referring to the particular embodiment of my invention illustrated by the accompanying drawing, I have shown a multiple operated separable fastening means particularly adapted for closures which must be completely separated at both ends at specified times. In the installation illustrated I have shown two stringers 1 and 2 to the adjacent edges of which are attached series of fasteners 3 of any suitable construction for uniting the edges of the stringers. The usual slider 4 is provided for engaging and disengaging the fasteners 3.

At adjacent ends of the stringers 1 and 2, close to the ends of the rows of fasteners 3, I have provided end fastening members comprising a female or socket member secured to the stringer 2 and a pin or male member secured to the stringer 1. These members are adapted to be separated by passage of the male member through one side channel of the slider 4 and to be engaged by entrance of the male member into the slider only when the slider is located in a particular relation to the female member, as will be hereinafter more fully described.

The male member is made from a single piece of sheet metal and has an integral tubular portion 5 of substantial length beginning adjacent to the edge of the stringer 1 to which a series of fasteners 3 is attached. Extending inwardly from the tubular portion 5 in spaced relation are two flanges 6 and 7 (Fig. 3) of substantial area which are clamped against opposite faces of the stringer to hold the male member in fixed relation to the stringer. A convenient means of attachment includes a number of prongs 8 pressed from the material of the flange 6 and passing through the stringer 1 and flange 7, the ends being upset, as illustrated in Figs. 1 and 2. Adjacent to one end of the tubular portion 5 of the male member, I have provided a lateral projection 9 which is adapted to cooperate with the fasteners 3 in such a manner that improper engagement of the fasteners 3 is impossible. The other end of the tubular portion 5 is rounded to ride easily over the ends of the fasteners 3 and has a head A provided by the shoulders 5ª for snap fastening engagement with the female member, as shown in Fig. 4.

The female member is made from two similar sheet metal pieces (Figs. 3 and 4) which cooperate to provide a socket member located adjacent to one end of a series of fasteners 3 secured to the stringer and held in position by flanges 11 and 12 extending inwardly therefrom in spaced relation (Fig. 3) and gripping the stringer 2 between them. The socket has a tubular pin-receiving portion 10 extending for a portion of the length of the socket member, as shown in Figure 1. The flanges 11 and 12 are held in position by prongs 13 in the same manner as the flanges 6 and 7 of the male member. A space 14 (Figs. 2, 3 and 4) divides the outer edges of the tubular portion 10 to permit entrance of the flanges 6 and 7 when the male member 5 is entered into the tubular portion 10 and also to provide resiliency to the tubular portion 10. A notch 15 is formed in the socket member above the tubular portion 10 to receive the projection 9 when the end members are properly engaged.

If we assume that the stringers are separated, the end members may be readily engaged, no matter where the slider is located on the stringer 1, and the male member 5 is easily and accurately pulled into engagement with the female portion 10 and the end members assume positions as shown in Fig. 1.

The head A formed on the lower end of the male member 5 is bulbous in shape and is offset laterally with relation to the axis of the pin portion, thereby to extend over the edge of the tubular socket portion 10 (Fig. 1), thereby to provide a sort of hook which prevents separation of the end connecting members 5 and 10 when engaged except by a tipping action of one relative to the other. This tipping action is caused by the slider 4 (Fig. 2) in order to permit the male member to pass through it.

The projection 9 on the male member 5 has a shoulder 16 which cooperates with shoulders 17—17 provided on the socket plates (Figs. 1 and

2) when the members are fully engaged to cooperate with the head A of the male member and effectively prevent accidental longitudinal separation of the members. The shoulders 16 and 17 are preferably angled relative to the respective axes of the male and female members so that they may be brought into engagement readily by a tipping action of one relative to the other (Fig. 2) as when the male member is entered into the socket through the slider 4.

The hollow socket portion may be made of such dimensions that the head A of the male member may pass through the greater portion of its length without it being necessary to expand the socket. The lower end is tapered inwardly (Fig. 4) to form cam surfaces 18—18 against which the head A is forced to spread the socket near the lower end just prior to its snapping through the socket.

Separation of the stringers is easily and quickly effected by simply pulling the slider 4 toward and into engagement with the end members, thereby tipping one relative to the other to release the shoulders 16 and 17 and also the head A. Then as the stringer 2 is moved longitudinally relative to the stringer 1 the male portion 5 may be pulled through the slider.

My improved end members are made from sheet metal, are simple and durable in construction, inexpensive to manufacture and easy to attach, and locked against accidental longitudinal separation both above and below the pin-receiving portion 10.

While I have illustrated and described a preferred embodiment of my invention, I do not wish to be limited thereby, because the scope of my invention is best defined by the following claims.

I claim:

1. In a fastener adapted to be completely separated at both ends, a pair of stringers, opposed series of fastener members on said stringers, a slider movable along said stringers to engage and disengage said fastener members, a separable end connection for said stringers comprising a socket member on one stringer having a tubular portion extending along part of the length thereof and a pin member on the other stringer for insertion into said tubular portion of said socket member and socket-engaging elements extending laterally from the pin and constructed and arranged for engagement with the socket member above and below the tubular portion for interlocking engagement with the socket member to prevent accidental longitudinal separation of the members of the separable end connection.

2. In a fastener adapted to be completely separated at both ends, a pair of stringers, opposed series of fastener members on said stringers, a slider movable along said stringers to engage and disengage said fastener members, a separable end connection for said stringers comprising a socket member on one stringer extending parallel to an edge thereof and a pin member on the other stringer extending parallel to an edge thereof for insertion in said socket member and snap fastening means provided partly by the pin in the form of a head at the bottom end thereof to provide interlocking means for engagement with the socket to prevent accidental separation of the members of the separable end connection, and said socket being split longitudinally to permit yielding thereof during engagement with and disengagement from the snap fastening means provided by the pin.

3. In a fastener adapted to be completely separated at both ends, a pair of stringers, opposed series of fastener members on said stringers, a slider movable along said stringers to engage and disengage said fastener members, a snap fastening separable end connection for said stringers comprising a socket member on one stringer extending parallel to an edge thereof and a pin member on the other stringer extending parallel to an edge thereof, one of said members being yieldable to permit snap fastening engagement of the separable end members, said pin being adapted to be entered into said socket member and having an enlarged head provided at one end of the pin and forming oppositely disposed lateral shoulders between the head and the pin for engagement beneath the lower end of the socket when snapped therethrough.

4. In a fastener adapted to be completely separated at both ends, a pair of stringers, opposed series of fastener members on said stringers, a slider movable along said stringers to engage and disengage said fastener members, a separable end connection for said stringers comprising a yieldable socket member on one stringer and a pin member on the other stringer for insertion in said socket member and snap fastening means comprising the yieldable socket member and a head on one end of the pin member passing through and extending beyond one end of the socket member, a shoulder beneath said head extending around three sides of the pin and extending laterally over one end of the socket at three sides thereof when the pin and socket are engaged to lock the members of the end connection against accidental separation.

5. In a fastener adapted to be completely separated at both ends, a pair of stringers, opposed series of fastener members on said stringers, a slider movable along said stringers to engage and disengage said fastener members, a separable end connection for said stringers comprising a socket member on one stringer having a tubular portion parallel to the stringer and a pin member on the other stringer parallel to an edge thereof for insertion in said tubular portion of said socket member, means on the socket member above the tubular portion providing a shoulder angled relative to the axis of the socket member, means on the pin providing a shoulder angled relative to the axis of the pin for cooperative interlocking engagement with the shoulder provided on the socket member as and for the purposes described and a head on one end of said pin member for interlocking engagement with the tubular portion of the socket member at that end opposite the end adjacent to the means presenting the angled shoulder.

6. In a fastener adapted to be completely separated at both ends, a pair of stringers, opposed series of fastener members on said stringers, a slider movable along said stringers to engage and disengage said fastener members, a separable end connection for said stringers comprising a socket member on one stringer and a pin member on the other stringer for insertion in said socket member, said pin member being formed from a flat piece of metal bent upon itself around the edge of one of said stringers and providing a pin portion adjacent to one edge of that stringer and also providing lateral extensions extending over opposite sides of the stringer, and said socket member being formed from two flat pieces of metal attached to opposite sides of the other stringer and being bent adjacent to the edge of that stringer to provide a hollow socket portion to receive the pin portion of the pin member, said hollow socket being yieldable and a head formed on the end of said pin portion for snap fastening engagement with said hollow socket to prevent accidental longitudinal separation of said end connection.

7. In a fastener adapted to be completely separated at both ends, a pair of stringers, opposed series of fastener members on said stringers, a slider movable along said stringers to engage and disengage said fastener members, a separable end connection for said stringers comprising a socket member on one stringer and a pin member on the other stringer for insertion in said socket member, said pin member being formed from a flat piece of metal bent upon itself around the edge of one of said stringers and providing a pin portion adjacent to one edge of that stringer and also providing lateral extensions extending over opposite sides of the stringer, and said socket member being formed from two flat pieces of metal attached to opposite sides of the other stringer and being bent adjacent to the edge of that stringer to provide a hollow socket portion to receive the pin portion of the pin member, said hollow socket being yieldable, a head formed on the end of said pin portion for snap fastening engagement with said hollow socket to prevent accidental longitudinal separation of said end connection and cooperating shoulders provided by said socket member and pin member, said shoulders being angled one to the axis of each member for the purposes described.

8. In a fastener adapted to be completely separated at both ends, a pair of stringers, opposed series of fastener members on said stringers, a slider movable along said stringers to engage and disengage said fastener members, a separable end connection for said stringers comprising a socket member on one stringer and a pin member on the other stringer for insertion into said socket member, one of said members being yieldable to permit snap fastening engagement of the said members, and a bulbous head provided at one end of said pin member for snap fastening engagement with the socket member, said bulbous head having its longitudinal axis offset laterally with relation to the axis of the pin member, thereby to project longitudinally with relation to the pin member at three sides only.

9. In a fastener adapted to be completely separated at both ends, a pair of stringers, opposed series of fastener members on said stringers, a slider movable along said stringers to engage and disengage said fastener members, a separable end connection for said stringers comprising a socket member on one stringer and a pin member on the other stringer for insertion into said socket member, one of said members being yieldable to permit snap fastening engagement of the said members, and a bulbous head provided at one end of said pin member for snap fastening engagement with the socket member, said bulbous head having its longitudinal axis offset laterally with relation to the axis of the pin member and toward the inner edge of the pin member, thereby to engage the socket member in such a manner as to prevent separation of the pin member from the socket member except by a relative tipping movement caused by the action of the slider when moved toward and into engagement with said end connection members.

10. In a fastener adapted to be completely separated at both ends, a pair of stringers, opposed series of fastener members on said stringers, a slider movable along said stringers to engage and disengage said fastener members, a separable end connection for said stringers comprising a socket member on one stringer and a pin member on the other stringer for insertion in said socket member and snap fastening means provided partly by the pin to provide interlocking means to prevent accidental separation of the members of the separable end connection, and said socket being split longitudinally to permit yielding thereof during engagement with and disengagement from the snap fastening means provided by the pin.

11. In a multiple interlocking fastener, a pair of fastener stringers, a separable end connection for such stringers comprising a socket forming member attached to one stringer and providing a longitudinally extending socket, a longitudinally extending pin attached to the other stringer for insertion in said socket, and cooperating snap retaining means on said pin and socket for yieldingly holding said pin in said socket after insertion.

GUSTAV JOHNSON.

---

CERTIFICATE OF CORRECTION.

Patent No. 2,015,035.  September 17, 1935.

GUSTAV JOHNSON.

It is hereby certified that error appears in the printed specification of the above numbered patent requiring correction as follows: Page 2, second column, lines 23 and 24, claim 4, after "stringer" insert the words extending parallel to an edge thereof; and that the said Letters Patent should be read with these corrections therein that the same may conform to the record of the case in the Patent Office.

Signed and sealed this 5th day of November, A. D. 1935.

(Seal)

Leslie Frazer
Acting Commissioner of Patents.

hollow socket being yieldable and a head formed on the end of said pin portion for snap fastening engagement with said hollow socket to prevent accidental longitudinal separation of said end connection.

7. In a fastener adapted to be completely separated at both ends, a pair of stringers, opposed series of fastener members on said stringers, a slider movable along said stringers to engage and disengage said fastener members, a separable end connection for said stringers comprising a socket member on one stringer and a pin member on the other stringer for insertion in said socket member, said pin member being formed from a flat piece of metal bent upon itself around the edge of one of said stringers and providing a pin portion adjacent to one edge of that stringer and also providing lateral extensions extending over opposite sides of the stringer, and said socket member being formed from two flat pieces of metal attached to opposite sides of the other stringer and being bent adjacent to the edge of that stringer to provide a hollow socket portion to receive the pin portion of the pin member, said hollow socket being yieldable, a head formed on the end of said pin portion for snap fastening engagement with said hollow socket to prevent accidental longitudinal separation of said end connection and cooperating shoulders provided by said socket member and pin member, said shoulders being angled one to the axis of each member for the purposes described.

8. In a fastener adapted to be completely separated at both ends, a pair of stringers, opposed series of fastener members on said stringers, a slider movable along said stringers to engage and disengage said fastener members, a separable end connection for said stringers comprising a socket member on one stringer and a pin member on the other stringer for insertion into said socket member, one of said members being yieldable to permit snap fastening engagement of the said members, and a bulbous head provided at one end of said pin member for snap fastening engagement with the socket member, said bulbous head having its longitudinal axis offset laterally with relation to the axis of the pin member, thereby to project longitudinally with relation to the pin member at three sides only.

9. In a fastener adapted to be completely separated at both ends, a pair of stringers, opposed series of fastener members on said stringers, a slider movable along said stringers to engage and disengage said fastener members, a separable end connection for said stringers comprising a socket member on one stringer and a pin member on the other stringer for insertion into said socket member, one of said members being yieldable to permit snap fastening engagement of the said members, and a bulbous head provided at one end of said pin member for snap fastening engagement with the socket member, said bulbous head having its longitudinal axis offset laterally with relation to the axis of the pin member and toward the inner edge of the pin member, thereby to engage the socket member in such a manner as to prevent separation of the pin member from the socket member except by a relative tipping movement caused by the action of the slider when moved toward and into engagement with said end connection members.

10. In a fastener adapted to be completely separated at both ends, a pair of stringers, opposed series of fastener members on said stringers, a slider movable along said stringers to engage and disengage said fastener members, a separable end connection for said stringers comprising a socket member on one stringer and a pin member on the other stringer for insertion in said socket member and snap fastening means provided partly by the pin to provide interlocking means to prevent accidental separation of the members of the separable end connection, and said socket being split longitudinally to permit yielding thereof during engagement with and disengagement from the snap fastening means provided by the pin.

11. In a multiple interlocking fastener, a pair of fastener stringers, a separable end connection for such stringers comprising a socket forming member attached to one stringer and providing a longitudinally extending socket, a longitudinally extending pin attached to the other stringer for insertion in said socket, and cooperating snap retaining means on said pin and socket for yieldingly holding said pin in said socket after insertion.

GUSTAV JOHNSON.

---

CERTIFICATE OF CORRECTION.

Patent No. 2,015,035.  September 17, 1935.

GUSTAV JOHNSON.

It is hereby certified that error appears in the printed specification of the above numbered patent requiring correction as follows: Page 2, second column, lines 23 and 24, claim 4, after "stringer" insert the words extending parallel to an edge thereof; and that the said Letters Patent should be read with these corrections therein that the same may conform to the record of the case in the Patent Office.

Signed and sealed this 5th day of November, A. D. 1935.

(Seal)

Leslie Frazer
Acting Commissioner of Patents.